FIG. I.

Patented June 13, 1950

2,510,969

UNITED STATES PATENT OFFICE 2,510,969

FOLDABLE AND RETRACTABLE ENDLESS TRACK TYPE LANDING GEARS

Alfred A. Gassner, New York, N. Y., assignor to Fairchild Engine and Airplane Corporation, New York, N. Y., a corporation of Maryland Application February 23, 1949, Serial No. 77,754

15 Claims. (Cl. 244—102)

This invention relates to retractable landing gear for aircraft and has particular reference to and endless track type of landing gear which is foldable and retractable for compact stowage after retraction within the body of the aircraft and constitutes an improvement in the gear disclosed in copending application Serial No. 45,597, filed August 23, 1948, now Patent 2,497,880, issued February 21, 1950.

As stated in said copending application, an increase in the overall weight of the aircraft requires a proportional increase in the track print area until for large and heavy craft such as cargo aircraft, the gear must be inordinately large in order to provide track print areas of a size to keep the ground pressure down to a safe value of between about 25 and 28 pounds per square inch static loading. Inasmuch as the width of the stowing nacelle limits the track width, it becomes necessary to increase the track length in order to maintain the required track print area. But when the track length is thus increased, retraction of the gear becomes practically impossible since the nacelle space of existing aircraft is too short to accommodate a long track, thus requiring aircraft redesign, which is usually not feasible since standard models are desired and should be adaptable without material change for use on landing fields with usual tricycle landing equipment, as well as for special uses as here described, merely by fitting them with the proper landing gear for the required service. The landing gear disclosed in said copending application meets these requirements and includes a separate cable retracting element to give the last contraction before retraction into the nacelle. The present invention provides a gear which is foldable into a still smaller compartment without the aid of an auxiliary cable.

In accordance with the present invention, an endless track type landing gear for even the largest known aircraft is provided, which is retractable into the stowage space of the aircraft and which affords the desirably low ground pressure of about 25 to 28 pounds per square inch in order to have the advantages of smaller, track-equipped aircraft, of maneuverability over, landing on and take-off from soft and irregular terrain. These desirable attributes are largely provided by the foldability of the gear before retraction into a small size and uniform shape, enabling it to be retracted into a relatively small rectangular nacelle space of cargo aircraft of existing design for stowage during flight, whereby existing cargo craft may be very heavily loaded and still be fully maneuverable under adverse conditions.

In a preferred embodiment of the invention, the endless track gear is provided with an extra ground-engaging idler roller or bogie about which the track belt may fold and the bolster or frame of the endless track gear is divided about a horizontal transverse axis, the front part of the frame carrying the front wheel or bogie assembly being pivotable upwardly about that axis by a hydraulically-actuated linkage to cause them and part of the track belt to move bodily rearwardly and upwardly upon the rear portion of the gear so that the gear assumes a generally C-shaped configuration, with the result that the overall length of the track is materially decreased from its normal extended position. Then the gear is moved bodily upwardly on parallel struts without rotation while in that C-shaped position and condition into the stowage nacelle wherein it reposes during flight.

It will be seen that by means of the compactly foldable landing gear of this invention, material redesign of existing aircraft becomes unnecessary in order to accommodate landing gear having sufficiently low ground pressure per square inch of track print surface to permit operations to, over and from the afore-mentioned unprepared and uneven or soft terrain.

For a more complete understanding of the invention, reference may be had to the acompanying drawings in which.

Figure 1:
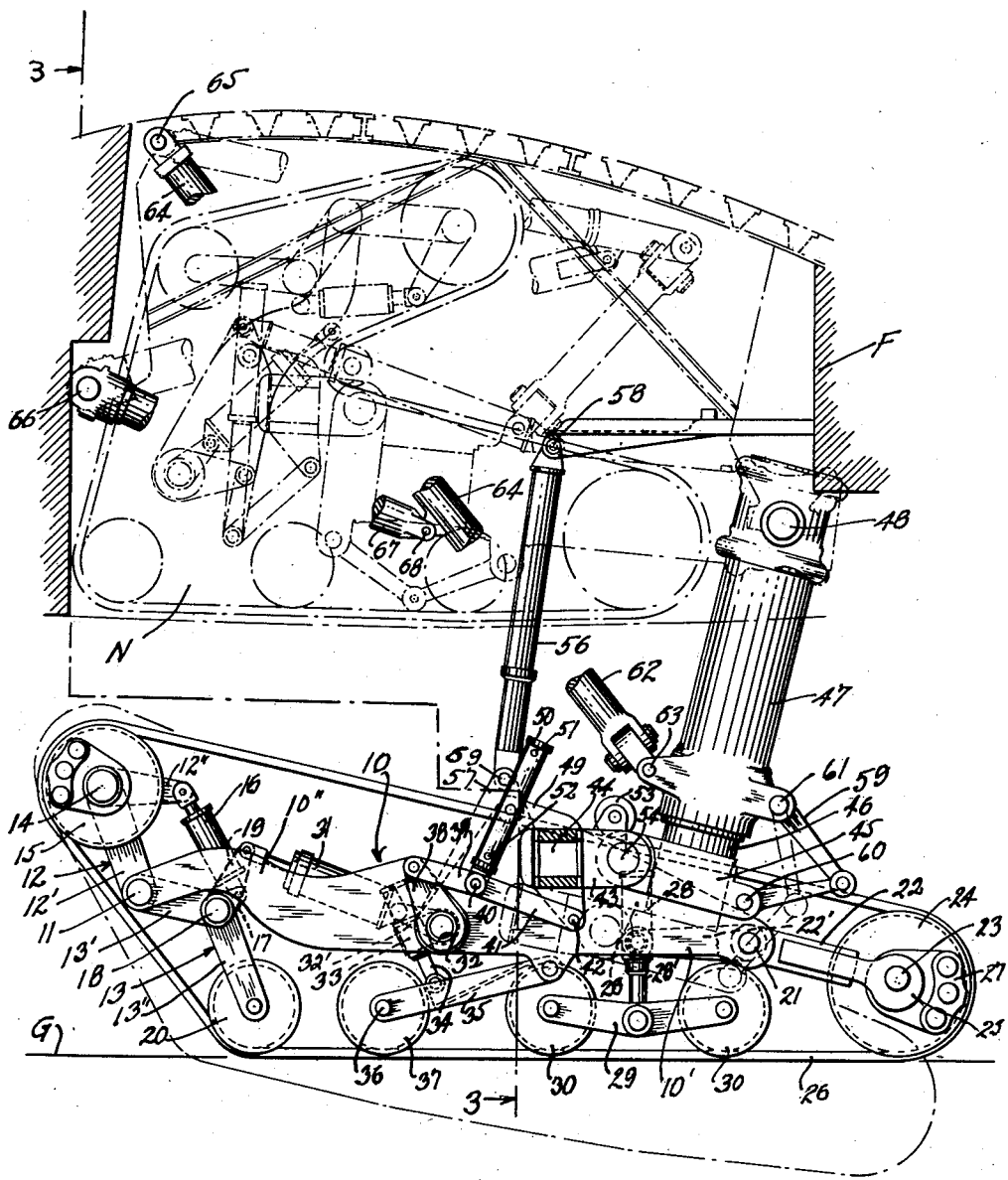
Figure 1 illustrates the foldable retracting gear of this invention shown both in the full ground contact position for static and taxiing purposes, and in dotted lines in the retracted and folded position within the stowage nacelle.

In the ensuing description, the near side of the gear will be described, it being understood that the other, or far side, is the same. Referring to Fig. 1, the bolster or frame 10 is divided into a main or fixed rear portion 10' and the movable or front portion 10", the articulation of these portions to be described. Front portion 10" of the frame 10 carries at its forward end the horizontal shaft 11 about which are pivoted two bell cranks 12 and 13, both at the free ends of their upper arms 12' and 13', respectively. Bell crank 12 carries at its elbow the horizontal shaft 14 for the front idler wheel or bogie 15 which is fully elevated above the ground surface G when the gear is in fully extended position. The free end of the other arm 12" of bell crank 12 is pivoted to the cylinder of a shock absorber 16 whose piston is connected to a lever 17 in turn connected to the elbow 18 of the bell crank 13, the free end of whose other lever 13" carries the front wheel or bogie 20.

Pivoted intermediate its ends on cross-shaft 21 at the rear frame portion 10' is a substantially horizontal lever 22 carrying at its rear free end the rear axle 23 upon which the rear wheel or bogie 24 is journalled through the intermediary of an eccentric 25 whereby the track 26 encircling wheels or bogies 15, 20 and 24 is automatically tightened to tension the track upon application of the brake 27, as is described in greater detail in copending application Serial No. 37,628, filed July 8, 1948, now Patent 2,504,128, issued April 18, 1950.

The forward end 22' of the rear horizontal lever 22 is pivoted to the cylinder of a vertical shock strut 28 whose piston rod 28' is pivoted to the approximate center of a substantially horizontal lever 29 at whose opposite free ends are journalled the two intermediate ground engaging wheels or bogies 30.

Figure 2:
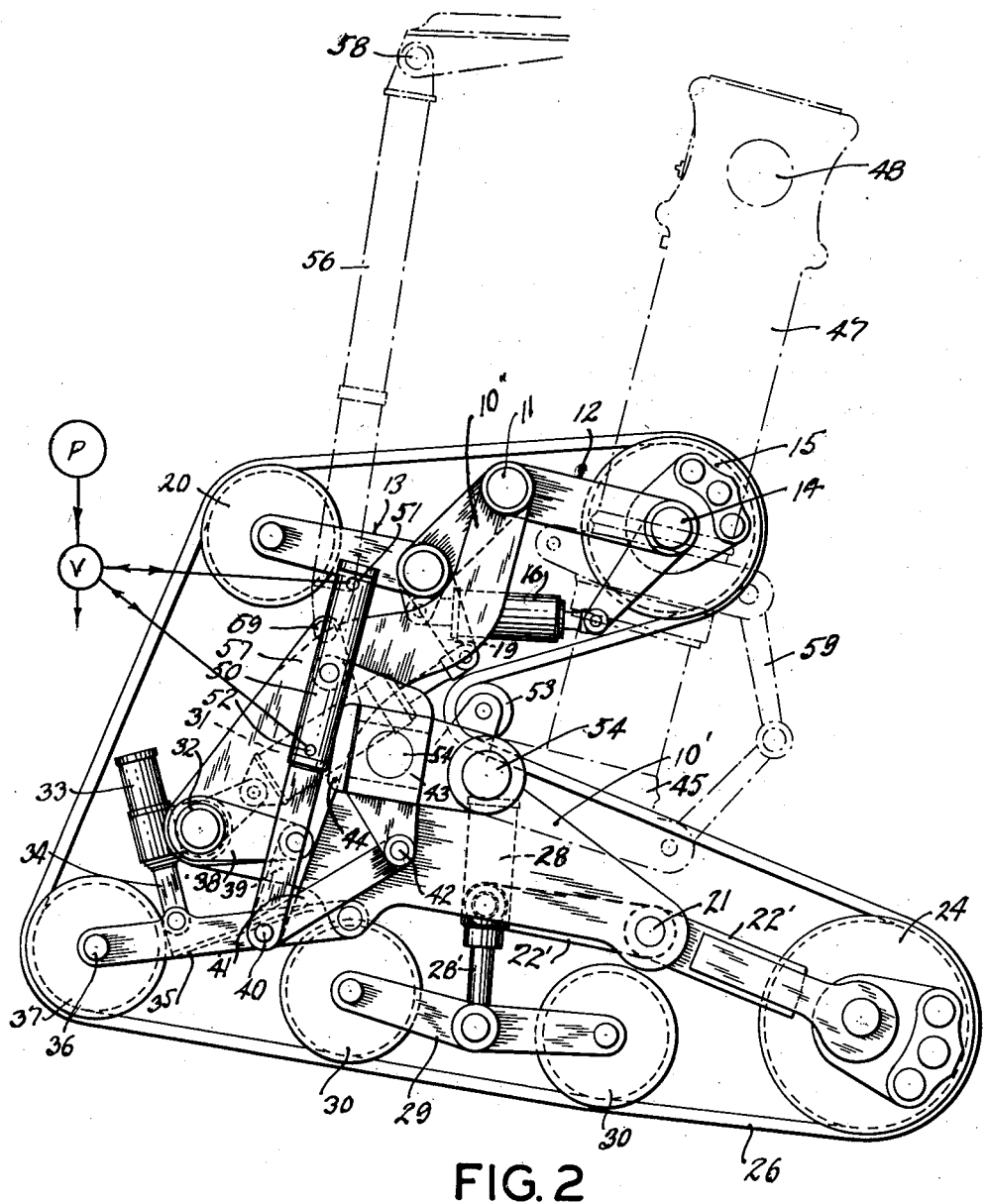
Fig. 2 shows the gear in folded position.

The front frame portion 10" is rigidly secured on a cross-shaft 32 journalled in rear frame portion 10' so that front frame portion 10" may move in an upward and rearward arc to swing the front bell cranks 12 and 13 upwardly and rearwardly in the manner shown particularly in Fig. 2.

A third shock strut 31 is connected between a lever 32' fixed on cross-shaft 32 and a lever 19 connected to the elbow of bell crank lever 13, as shown.

A fourth shock strut 33 also is secured to rear frame 10' with its piston rod 34 pivoted intermediate the ends of a lever 35 pivoted on rear frame portion 10' and carrying an axle 36 of a third idler wheel or bogie 37 about which the track 26 folds upwardly and rearwardly when front frame portion 10" is pivoted in that direction as shown in Fig. 2.

Rigidly secured on shaft 32 is a lever 38 whose free end is pivotally connected to a link 39 in turn pivoted by pin 40 to the second link 41 connected by pin 42 to a yoke 43 journalled on a fore-and-aft stub shaft 44, carried by the cantilever casting 45 on the lower end of the piston 46 of the main load carrying shock absorber strut 47 supported by transverse pivot pin 48 on the air frame F. Also carried by the yoke 43 so as to be tiltable with it about fore-and-aft pivot 44 is a bracket 49 carrying the power cylinder 50 whose piston rod is pivoted to the pin 40 connecting the aforementioned links 39 and 40, which accordingly form a toggle.

Suitable hydraulic control means connected to respective upper and lower ports 51 and 52 extend and retract the power cylinder 50, i. e., when hydraulic fluid under pressure is supplied by pump P to upper port 51 by manipulation of valve V by the operator, cylinder 50 is extended to drive toggle links 39 and 40 downwardly, thereby causing lever 38 to rotate cross-shaft 32 and raise the front frame portion 10" upwardly and rearwardly about the axis of cross-shaft 32. As shown particularly by Fig. 2, bogies or wheels 15 and 20 and the forward portion of track 26 are carried with front frame 10" so that the track 26 is folded back on itself about idler bogie 20 at its lower course and at its upper course about a cross-roller 53 carried by yoke 43. When the hydraulic pressure fluid is supplied through valve V into lower port 52 of power cylinder 50, the reverse or unfolding operation occurs. The hydraulic system is preferably constructed like that disclosed in said copending application Serial No. 45,597.

Figure 3:
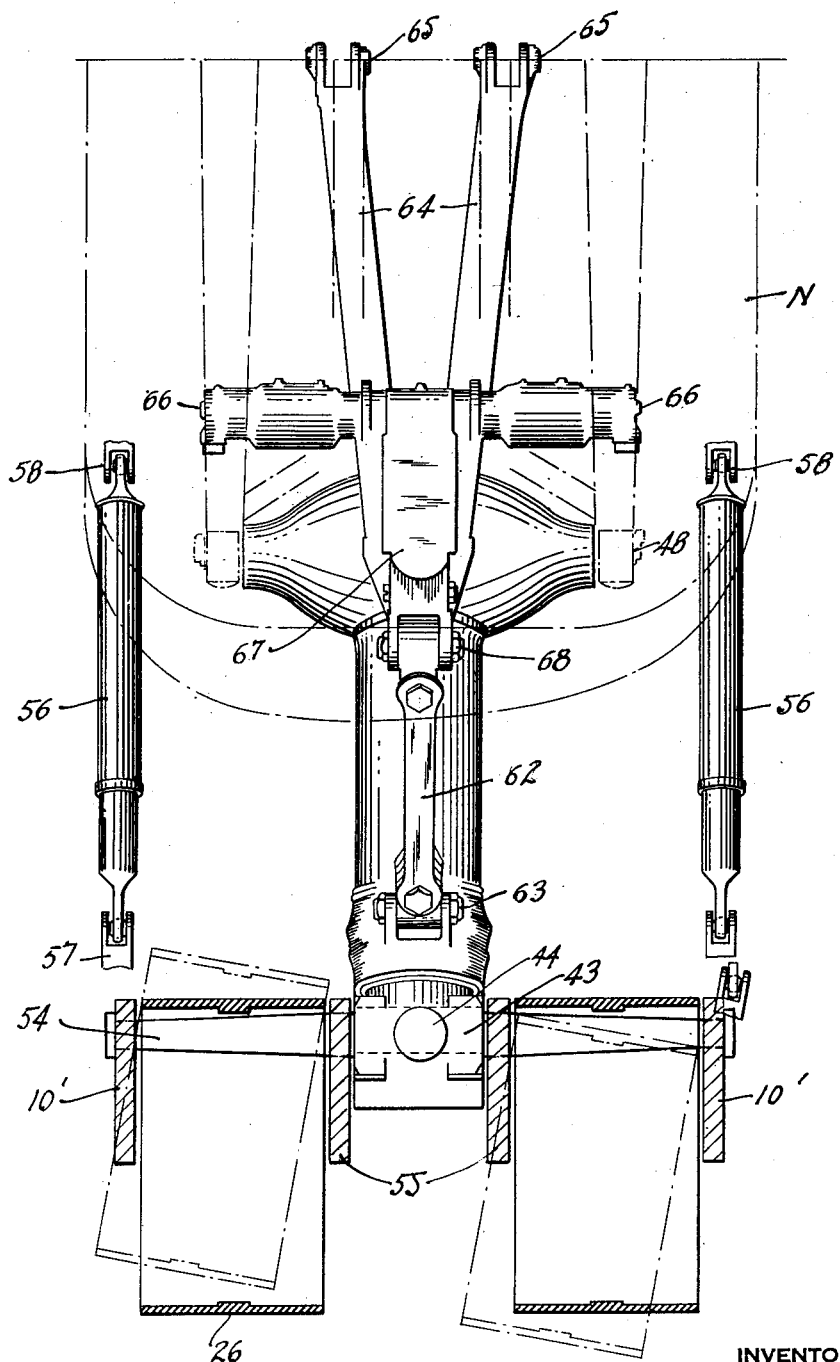
Fig. 3 is a front view of the gear in extended position as seen in partial sectional view along the line 3—3 of Fig. 1.

Secured on pivotal yoke 43 is the horizontal bar 54 on whose opposite free ends are mounted the bolsters largely constituting the rear frame 10' and including the intermediate bolsters 55 so that the entire frame 10 composed of the relatively stationary rear portion 10' and the pivoted forward portion 10" may tilt laterally to an extent limited by auxiliary struts 56 extending between the horn 57 on the forward portion 10" of the frame and a pivot point 58 on the air frame F. The bodily rotation of the frame 10 and consequently of the landing gear itself about horizontal fore-and-aft axis 44 is limited in this fashion to approximately 10° at either side of horizontal, as is indicated in dotted lines in Fig. 3, and is sufficient to enable the gear to accommodate obstructions, uneven ground and other irregularities during taxiing, take-off and landing.

The afore-mentioned auxiliary shock struts 56 extending from pivot points 58 on the air frame F to pivot points 59 on the horn 57 of the rear frame portion 10" aid main strut 47 in transmitting the weight of the airplane to the track gear under normal landing, taxiing and static conditions of the craft. When the airplane is in the air, struts 47 and 56 extend to the limit of their length and the track gear assumes substantially the position shown by the dot-and-dash lines in Fig. 1. A linkage 59 extends between pivot point 60 on piston casting 45 and pivot 61 on the lower end of the cylinder 46 of shock strut 47 to maintain the track oriented parallel to the fore-and-aft axis of the aircraft.

The lower portion of the necelle N in the air frame F is open and within it is located the retracting mechanism for the gear, which is additional to and, to a certain extent, independent of the track folding mechanism just described. It includes a link 62, connecting the lower end of the shock strut 47 by a cross-pin 63, to which are connected the lower ends of a pair of links 64 pivoted at their upper ends on pins 65 to the air frame F within the nacelle N. Also pivoted at point 66 on the air frame within the necelle N is the main retraction actuating strut 67 connected at its lower end 68 to the links 64 and being adapted to extend and retract hydraulically by the admission to opposite sides of the piston of pressure fluid controlled by a valve in a manner well understood and disclosed in detail in said copending application Serial No. 45,597.

In operation of the landing gear of this invention, and considering the folding operation, immediately after take-off of the aircraft, the operator moves the control valve to admit pressure fluid to the inlet port 51 of the folding actuating strut 50, thereby causing it to extend from the shortened length shown in Fig. 1 to the extended length shown in Fig. 2. The extension of the actuating strut 50 forces links 39 and 41 downwardly, thereby causing lever 38 to be rotated clockwise about the axis of cross-shaft 32. Inasmuch as lever 38 is rigidly fastened on cross-shaft 32, journalled in the front end of rear frame portion 10', and as the forward frame portion 10" is rigidly secured to shaft 32, it is rotated upwardly and rearwardly by lever 38 about the axis of shaft 32 from the position shown in Fig. 1 to the position in Fig. 2. Inasmuch as the forward frame portion 10" carries the bell cranks 12 and 13 on which front wheel 15 and front idler wheel 20 are mounted, these wheels 15 and 20 also move upwardly and rearwardly with forward frame portion 10" carrying the corresponding part of the track 26 with them, which folds about idler wheel or bogie 37, as shown. By reason of the roller 53 extending across the upper surface of the upper course of the track 26, the track is folded about roller 53 in the manner shown in Fig. 2.

Inasmuch as the lower ends of struts 56 are connected to the horn 57 of the relatively stationary rear frame portion 10', they do not swing during the folding operation, nor does main shock strut 47, although both lengthen as shown in Fig. 2 because they have been relieved of the static or taxi load and are pulled out by the weight of the gear. It will be observed that struts 47 and 56 are substantially parallel.

Following the folding and rotation of the entire track assembly to the position shown in Fig. 2, as described, the operator moves the control valve to retraction position, which pumps pressure fluid to retraction actuating strut 67 to cause it to extend to fold links 56 about their pivot points 58 and draw frame 10 upwardly with them. At the same time, the main load strut 47 swings forwardly and upwardly about its pivot point 48 so as to raise the entire gear without substantial rotation, from the Fig. 2 position into the nacelle N in the manner indicated in dotted lines in Fig. 1. Because the supporting struts 47 and 56 are substantially parallel, the entire gear moves upwardly in an attitude which remains substantially parallel to itself without substantial rotation as stated. It will be understood that the gear is locked in folded, unfolded, retracted and extended positions by the hydraulic fluid pressure in actuating cylinders 50 and 67.

In extending the gear from the stowed position shown in dotted lines in Fig. 1, to the landing position also shown in Fig. 1, the afore-mentioned hydraulic power cylinders 50 and 67 will be operated in reverse sequence, first to supply the main retracting strut 67 with pressure fluid to shorten the same and lower the gear to the folded position shown in Fig. 2 and to supply the lower port 52 of the folding actuating strut 50 to shorten the same from the length shown in Fig. 2 to that shown in Fig. 1 to effect the unfolding of the gear from the folded shape shown in Fig. 2 to the fully extended shape shown in Fig. 1. It will be understood that the operation of the several parts is effected in the reverse order from that previously described in connection with folding and locking prior to retraction.

When the gear is extended to the position shown in Fig. 1, the aircraft is ready to land, the rear end or heel of the track 26 engaging the ground first by reason of the lower position of the rear bogie 24, as shown in dotted lines in Fig. 1. As the rear of the track engages the ground, the main load strut 47 contracts on impact and the gear swings about horizontal pivot 54 in a counter-clockwise direction until the full track print engages the ground as shown in solid lines in Fig. 1, the track meanwhile adjusting itself laterally about fore-and-aft pivot 44 in the manner indicated in Fig. 3 to accommodate lateral unevenness of the ground.

It will be understood that two or more of the landing gear illustrated and described will be used on each aircraft, or one of them with pilot wheels, and the like, depending upon requirements. Also, the nose gear may be made steerable in a suitable manner, and the control mechanism may be made automatically sequential in the manner described in said copending application Serial No. 45,597.

Although a preferred embodiment of the folding endless track gear has been illustrated and described herein, it is understood that the invention is not limited thereby nor is this folding track limited to use on airplanes, but is susceptible of other uses and to changes in form and detail within the scope of the appended claims.

I claim:

1. In aircraft landing gear of the endless track type having a longitudinal frame, front and rear wheels carried thereby and an endless belt encircling said wheels, the combination of hinge means dividing said frame transversely into aligned front and rear portions, means for folding one frame portion relatively to the other portion to collapse the gear, substantially parallel link means pivotally connecting said frame to the aircraft about corresponding parallel axes, and means for swinging said collapsed gear bodily parallel to itself about said parallel axes.

2. In aircraft landing gear of the endless track type having a longitudinal frame, front and rear wheels carried thereby and an endless belt encircling said wheels, the combination of hinge means dividing said frame transversely into aligned front and rear portions, means for folding one frame portion relatively to the other portion to collapse the gear, substantially parallel link means pivotally connecting said frame to the aircraft about corresponding parallel axes, and motive means for swinging said collapsed gear bodily parallel to itself about said parallel axes.

3. In aircraft landing gear of the endless track type having a longitudinal frame, front and rear wheels carried thereby and an endless belt encircling said wheels, the combination of parallel spaced struts extending downwardly from the aircraft and pivoted about horizontal pivots thereon, substantially horizontal transverse pivots connecting said frame to said struts, hinge means dividing said frame transversely into aligned front and rear portions, motive means for swinging said frame portions relatively to each other about said hinge means to at least partially fold one frame portion on the other, and motive means for swinging said folded frame portions bodily parallel to itself on said struts about said pivots.

4. In aircraft landing gear of the endless track type having a longitudinal frame, front and rear wheels carried thereby and an endless belt encircling said wheels, the combination of hinge means dividing said frame transversely into aligned front and rear portions, motive means for swinging said front frame portions upwardly and rearwardly about said hinge means to at least partially fold said first frame portion upon the rear frame portion, substantially parallel link means connecting said rear frame portion to the aircraft about corresponding horizontal axes, and motive means to swing said folded gear bodily upward substantially parallel to itself about said horizontal axes.

5. In aircraft landing gear of the endless track type having a longitudinal frame, front and rear wheels carried thereby and an endless belt encircling said wheels, the combination of parallel spaced struts extending downwardly from the aircraft and pivoted about horizontal pivots thereon, substantially horizontal transverse pivots connecting said frame to said struts, hinge means dividing said frame transversely into aligned front and rear portions, motive means carried by said frame for swinging said frame portions relatively to each other about said hinge means to at least partially fold one frame portion on the other, and motive means for swinging said folded frame portions bodily parallel to itself on said struts about said pivots.

6. In aircraft landing gear of the endless track type having a longitudinal frame, front and rear wheels carried thereby and an endless belt encircling said wheels, the combination of parallel spaced struts extending downwardly from the aircraft and pivoted about horizontal pivots thereon, substantially horizontal transverse pivots connecting said frame to said struts, hinge means dividing said frame transversely into aligned front and rear portions, motive means carried by said rear frame portion for swinging said frame portions relatively to each other about said hinge means to at least partially fold one frame portion on the other, and motive means for swinging said folded frame portions bodily parallel to itself on said struts about said pivots.

7. In aircraft landing gear of the endless track type having a longitudinal frame, front and rear wheels carried thereby and an endless belt encircling said wheels, the combination of hinge means dividing said frame transversely into aligned front and rear portions, motive means carried by said rear frame portion for swinging said front frame portions upwardly and rearwardly about said hinge means to at least partially fold said frame portion upon the rear frame portion, substantially parallel link means connecting said rear frame portion to the aircraft about corresponding horizontal axes, and motive means to swing said folded gear bodily upwardly substantially parallel to itself about said horizontal axes.

8. In aircraft landing gear of the endless track type having a longitudinal frame, front and rear wheels carrier thereby and an endless belt encircling said wheels, the combination of substantially parallel spaced struts pivotally connecting said frame to the aircraft, hinge means dividing said frame transversely into aligned front and rear portions, motive means carried by one of said frame portions for swinging said frame portions relatively to each other about said hinge means to at least partially fold one frame portion upon the other, and second motive means interposed between the aircraft and said struts for swinging said gear bodily upwardly parallel to itself upon said struts into a retracted position.

9. In aircraft landing gear of the endless track type having a longitudinal frame, front and rear wheels carried thereby and an endless belt encircling said wheels, the combination of substantially parallel spaced struts pivotally connecting said frame to the aircraft, hinge means dividing said frame transversely into aligned front and rear portions, motive means on said rear frame portions for swinging said front frame portion upwardly and rearwardly about said hinge means to at least partially fold said front frame portion upon said rear frame portion, and second motive means interposed between said gear, said struts and the aircraft for swinging said gear upwardly parallel to itself upon said struts into a retracted position.

10. In endless track gear of the type having a longitudinal frame, front and rear wheels carried thereby and an endless belt encircling said wheels, the combination of hinge means divided said frame transversely into aligned front and rear portions, said hinge means including a shaft journalled in said rear frame portion and rigidly secured to said front frame portion for movement therewith, a lever secured to said shaft, a toggle interposed between said lever and said rear frame portion, a hydraulic cylinder and piston combination connected at one end to said toggle and pivoted at the other end on said rear frame portion, and means for supplying fluid under pressure to said cylinder for actuating the piston therein to thereby cause said piston to swing said front frame portion, the corresponding front wheel and the corresponding section of the belt to and from at least partially folded position over said rear frame portion.

11. In endless track gear of the type having a longitudinal frame, front and rear wheels carried thereby and an endless belt encircling said wheels, the combination of hinge means dividing said frame transversely into aligned front and rear portions, said hinge means including a shaft journalled in said rear frame portion and rigidly secured to said front frame portion for movement therewith, a lever secured to said shaft, a toggle interposed between said lever and said rear frame portion, a hydraulic cylinder and piston combination connected at one end to said toggle and pivoted at the other end on said rear frame portion, a source of fluid under pressure to said cylinder for actuating the piston therein, and a valve in said connections for controlling the flow of pressure fluid to said cylinder to thereby cause said piston to swing said front frame portion, the corresponding front wheel and the corresponding section of the belt to and from at least partially folded position over said rear frame portion.

12. In endless track gear of the type having a longitudinal frame, front and rear wheels carried thereby and an endless belt encircling said wheels, the combination of hinge means dividing said frame transversely into aligned front and rear portions, a toggle connecting said rear portion to said front portion at a point spaced from said hinge, and motive means carried by one of said frame portions and connected to said toggle for swinging said front frame portion upwardly and rearwardly about said hinge means to at least partially fold said front frame portion, the corresponding wheel and the corresponding belt section upon the rear frame portion and its appurtenant wheel and belt section.

13. In endless track gear of the type having a longitudinal frame, front and rear wheels carried thereby and an endless belt encircling said wheels, the combination of hinge means dividing said frame transversely into aligned front and rear portions, a toggle connecting said rear portion to said front portion at a point spaced from said hinge, motive means carried by one of said frame portions and connected to said toggle for swinging said front frame portion upwardly and rearwardly about said hinge means to at least partially fold said front frame portion, the corresponding wheel and the corresponding belt section upon the rear frame portion and its appurtenant wheel and belt section, substantially parallel struts connecting said frame by horizontal pivots to the aircraft, and motive means connected to said struts for bodily swinging said frame upwardly parallel to itself into retracted position.

14. In endless track gear of the type having a longitudinal frame, front and rear wheels carried thereby and an endless belt encircling said wheels, the combination of hinge means dividing said frame transversely into aligned front and rear portions, motive means for swinging said front frame portion upwardly and rearwardly about said hinge means to at least partially fold said front frame portion, the corresponding wheel and the corresponding belt section upon the rear frame portion and its appurtenant wheel and belt section, an intermediate ground wheel mounted on said rear frame portion and extending across the inner surface of the belt at a point substantially opposite said hinge means about which the belt is folded during the said swinging movement of said front frame portion.

15. In endless track gear of the type having a longitudinal frame, front and rear wheels carried thereby and an endless belt encircling said wheels, the combination of hinge means dividing said frame transversely into aligned front and rear portions, motive means for swinging said front frame portion upwardly and rearwardly about said hinge means to at least partially fold said front frame portion, the corresponding wheel and the corresponding belt section upon the rear frame portion and its appurtenant wheel and belt section, a member mounted on said frame and extending across the upper surface of said belt intermediate said front and rear wheels about which the upper portion of said belt is folded, an intermediate ground wheel mounted on said rear frame portion and extending across the inner surface of the belt at a point substantially opposite said hinge means about which the belt is folded during the said swinging movement of said front frame portion.

ALFRED A. GASSNER.

REFERENCES CITED

The following references are of record in the file of this patent:

UNITED STATES PATENTS

| Number | Name | Date |
| --- | --- | --- |
| 1,552,283 | Elder | Sept. 1, 1925 |
| 2,169,443 | Burke | Aug. 15, 1939 |

FOREIGN PATENTS

| Number | Country | Date |
| --- | --- | --- |
| 754,073 | France | Aug. 21, 1933 |

Certificate of Correction

Patent No. 2,510,969 June 13, 1950

ALFRED A. GASSNER

It is hereby certified that error appears in the printed specification of the above numbered patent requiring correction as follows:

Column 7, line 32, for the words "said frame" read *said first frame*; line 41, for "carrier" read *carried*; line 73, for "divided" read *dividing*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*